Figure 1:
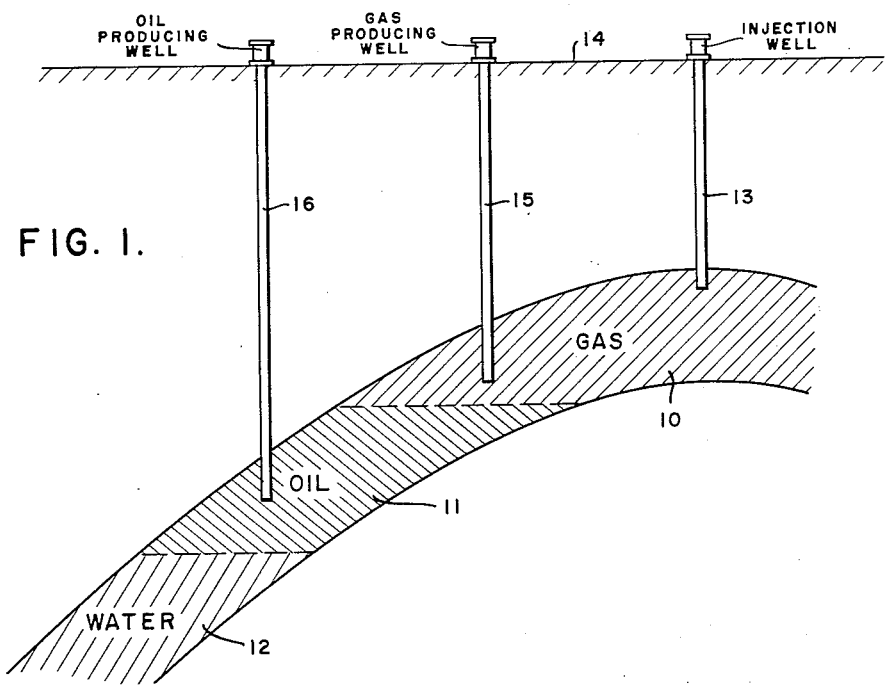

INVENTORS.
HARRY S. ARENDT,
JAMES W. GLANVILLE,
BY
ATTORNEY.

3,131,760
GAS RECOVERY
Harry S. Arendt, Bellaire, Tex., and James W. Glanville, New York, N.Y., assignors, by mesne assignments, to Jersey Production Research Company, Tulsa, Okla., a corporation of Delaware
Filed Dec. 8, 1959, Ser. No. 858,122
3 Claims. (Cl. 166—9)

This invention concerns replacing the gas-cap gas of an oil reservoir with water. It also concerns injecting water into the crest of a gas cap for pressure maintenance to prevent gas-cap shrinkage, or other conservation purposes.

The recovery of gas from gas caps has major economic significance. Since many oil fields have appreciable gas caps, the production of gas-cap gas realizes current income from the sale thereof as well as providing optimum utilization of this valuable natural resource. Until recently, it was assumed that gas-cap gas reserves should be left intact until the end of oil production in order to avoid oil and gas-cap shrinkage losses caused by the release of gas pressure on the oil zone. However, it is now recognized that gas-cap gas can be replaced or substituted by an inert nonsalable material such as an inert gas. The use of inert gas as, for example, flue gas or internal combustion engine exhaust gas for pressure maintenance, however requires investment costs for compressors and other equipment. Inert gas substitution has the additional disadvantage of dilution and contamination of the produced gas with the injected inert gas. Also, when flue gases are used as the inert gas, serious corrosion problems result.

These enumerated disadvantages of employing inert gas as the gas-cap gas substitution material are overcome by employing water instead of inert gas.

In many reservoirs the vertical height of gas-caps above the water-oil contact is considerable and because of that the connate water in the gas cap is substantially below the water saturation at which initial flow of water occurs. Therefore, a substantial amount of water can be essentially permanently held by injecting water into the gas cap and building the water saturation up from connate saturation to the saturation at which initial flow occurs.

Further, in certain type reservoirs having one or more of the particular characteristics of (1) a large distance along the bedding plane between the crest of the structure and the gas-oil contact; (2) a low angle of dip; and (3) a low to medium permeability, it is possible to inject substantially greater volumes of water into the gas cap than the amount at which initial water flow occurs without the water reaching the oil sand prior to depletion of the oil sand, or in any event, without damage to the oil zone after the water reaches the oil zone. By damage to the oil zone is meant the possibility of the injected water reaching the oil sand and interfering with the production of oil. For example, water encroachment into the oil zone can result in an increase in water production with resultant increase in lifting cost and water gravitation to the lower part of the oil zone can result in the oil moving into the gas cap with a consequent oil loss due to oil wetting of the gas-cap rock.

Thus, in general, a primary object of the present invention is to provide an improved method for the recovery of gas-cap gas.

Figure 2:
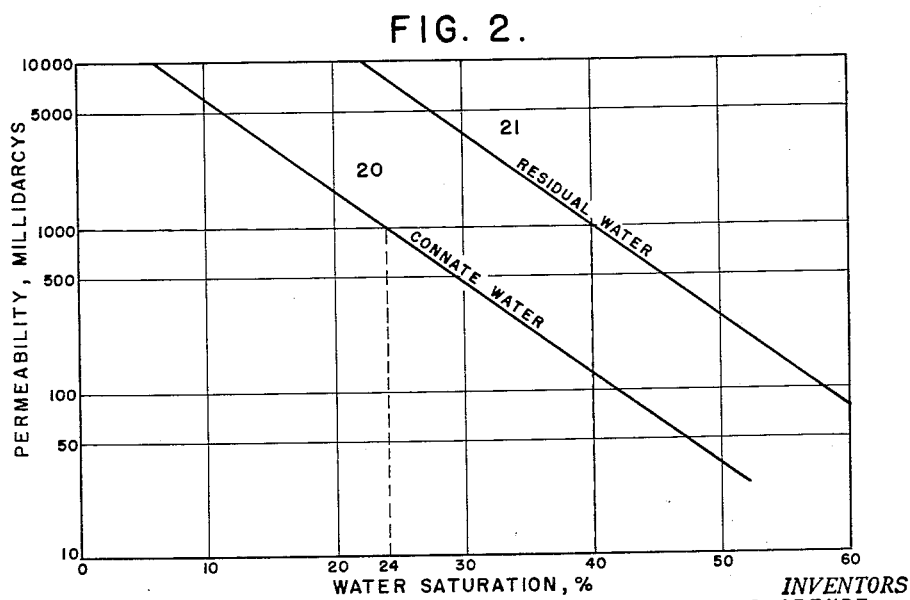

This and other objects of the invention will be apparent from a more detailed description thereof taken in conjunction with the drawings wherein:

FIG. 1 represents a cross-sectional view of the earth's subsurface and shows wells penetrating the earth to a subsurface reservoir; and FIG. 2 shows curves of permeability vs. connate water and permeability vs. residual water saturation for a particular field reservoir.

Referring to the drawings in greater detail, in FIG. 1 is shown a typical subsurface reservoir containing a gas cap 10, an oil zone 11, and an underlying water zone 12. A water injection well 13 extends from the earth's surface 14 into the crest of the gas cap 10 and a gas production well 15 extends from the earth's surface 14 to a point in the gas cap 10 down-dip of water injection well 13. An oil production well 16 extends from the earth's surface 14 into oil zone 11.

In operation, oil is produced through well 16 and gas from gas cap 10 is produced through well 15. Water is injected through injection well 13 to replace the gas produced through well 15 and maintain pressure on oil zone 11.

The amount of water that may be injected before initial flow of water in gas cap 10 occurs is determinable from water-oil relative permeability data. Referring to FIG. 2, a connate water curve 20 which was derived from capillary pressure curve data for a particular reservoir and a curve 21 for the minimum water saturation at which water flow occurs which was derived from water relative permeability curves for the same reservoir for a water-kerosene system are shown. From these curves, it can be seen that at a permeability of 1,000 millidarcys the connate water is 24% and the minimum water saturation at which flow occurs is 40%. This shows that water saturation in the gas cap may be increased 16% of the total pore volume before water will begin to flow. On the basis of 76% original gas saturation, it is seen that 21% of the total gas can be replaced without creating permeability to water. Similar connate water and initial water flow curves for other field reservoirs show that in many instances, even higher portions of the gas in the gas cap can be replaced.

Additional quantities of water beyond the amount at which initial flow occurs can be injected into the gas caps of most reservoirs. The fraction of the gas-cap pore volume which can be injected above the amount at which initial flow occurs is primarily dependent upon the reservoir characteristics of: distance between the crest of the structure and the gas-oil contact, angle of dip, permeability of the formation, and the increase of relative permeability to water with increasing water saturation. Under favorable conditions of long distance, low to moderate angle of dip, and low to moderate permeability, a majority of the gas-cap gas can be replaced by water without interference with oil production. Under unfavorable conditions, only a minor additional volume of water above the point of initial flow can be injected. For a given set of reservoir characteristics, the volume of water that can be injected varies inversely (but usually not proportionately) with the length of the period during which injected water must not interfere with oil production. The volume of water that can be injected which will still retain an adequate period of non-interference with oil production, or conversely the period of non-interference for a given injected volume, can be ascertained by model studies or calculated from the gravity drainage rate equation:

$$(1) \quad q = \frac{0.044 \times 144 \times K_w \times A \times \Delta\rho \times \sin \alpha}{\mu_w}$$

where $q$ is the volume of water flowing down-structure past a given level, cu. ft./day;

$K_w$ is the effective permeability to water at the water saturation existing at the given level, darcys;

$A$ is the cross sectional area open to flow at the given level, sq. ft.;

$\Delta\rho$ is the difference in gravity head (water minus gas), p.s.i./ft.;

$\alpha$ is the angle of dip;

$\mu_w$ is the viscosity of water, centipoises. The above equation can be modified to the form:

$$(2) \quad q/A = \frac{0.044 \times 144 \times K_w \times \Delta\rho \times \sin \alpha}{\mu_w \times \phi \times (\Delta S_w)}$$

where $q/A$ is the superficial velocity of the water front, ft./day;

$K_w$ becomes the effective permeability to water at residual gas saturation, darcys;

$\phi$ = porosity, fraction;

$\Delta S_w$ = the change in water saturation that occurs with passage of the water front through the sand, fraction. This would be $1 - C_w - Sg_r$ or 1 minus connate water minus residual gas.

The above modification, Equation 2, assumes that water is continuously injected at a daily rate equal to the volume of water invading the new formation each day so that the previously watered out zone is constantly replenished and maintained at maximum water saturation (1 minus residual gas saturation). Under this condition all of the gas-cap gas except that comprising residual gas saturation will be replaced at the time that the water front reaches the gas-oil contact. This constitutes maximum replacement (usually about 70% of the gas in place) and can only be attained where reservoir characteristics are favorable or the time of oil production is only moderately long. However, it is applicable for a number of reservoirs, the solution is easy and direct, and it gives preliminary information for reservoirs for which complete replacement is not possible.

For example, for a Reservoir A the advance of water over a distance of 0.5 mile through a sand with a permeability of 100 millidarcys and a dip of 3 degrees would require 45 years and would permit production of all but residual gas saturation. If in this reservoir the oil will be depleted in less than 45 years, maximum replacement can be utilized. However, even if oil operations will extend more than 45 years in the future, partial replacement can be attained.

For partial replacement it often may be desirable to inject at the critical rate (the rate provided for by Equation 2) or possibly at an even higher rate until the desired volume of water has been injected, and then terminate injection. When injection is terminated, water is available for further advance downstructure only by drainage from the previously flooded zone, which consequently reduces the water saturation in that zone. The reduced water saturation results in a reduced effective permeability to water, which in turn reduces the rate of drainage from the already invaded zone and the supply of water for further advance. With the front being inadequately supplied with water and with the supply continuously decreasing, the rate of advance steadily decelerates. Equation 1 can be utilized to calculate the rate of advance after termination of injection, although for this procedure it is necessary to divide the future time into from 5 to 10 time intervals and to solve for the advance in each time interval. It is also necessary to divide the distance from the injection wells to the gas-oil contact into several segments or layers and for each time interval solve for the drainage rate from each layer starting from the top.

For example, in the previously referred to Reservoir A, if water is injected at the critical rate for 22.5 years, the water front will have advanced 0.25 mile during the 22.5 years. If injection is then terminated, 80 years more will be required for the front to advance the remaining 0.25 mile. This would provide a total period of slightly over 100 years.

Also, for Reservoir A it might be desirable to accelerate the injection to 4.5 times the critical rate to complete the partial replacement program in 5 years. Under these circumstances the first 0.25 mile advance would take place in 5 years but the last 0.25 mile would still require 80 years for a total of 85 years.

For another example, a Reservoir B had a distance of 6,000 feet from crest to contact, a dip of 4 degrees, and permeability of 400 millidarcys. With full replacement of all except residual gas only 20 years would be available, which is much less than the 60 years remaining oil productive life. However, to accomplish the desired objective, it would be necessary to inject a volume of only 35 percent of full replacement. This could be done in 4 years, with the front moving about 2,500 feet during that time. The remaining 3,500 feet of movement would require approximately 70 years which would provide ample time.

In most instances adequate produced water will be available for use to practice the method of the invention. This water is being disposed of at present at appreciable expense. Another advantageous feature of the invention is that conversion to gas-cap water injection results in very small additional cost. Another consideration is that even if it is necessary to ultimately employ inert gas injection or some other means to obtain all of the gas before completion of the oil operations, it is possible to produce the first 25 to 60% of the gas by water replacement at virtually no cost and with a corresponding saving in the ultimate cost of the overall project.

Having fully described the nature, method, and objects of our invention, we claim:

1. A method of gas and oil recovery from the gas and oil sands of a petroleum fluid-containing subterranean reservoir comprising the steps of: injecting water into the area of the top of said gas sands through an injection well penetrating said reservoir while simultaneously producing gas from said gas sands through a gas production well penetrating said reservoir down-dip of the water injection well and up-dip of the gas-oil contact and producing oil from said oil sands through an oil production well penetrating said reservoir down-dip of the gas-oil contact.

2. A method of gas and oil recovery from the gas and oil sands of a petroleum fluid-containing subterranean reservoir comprising the steps of: injecting water into the area of the top of said gas sands through an injection well penetrating said reservoir in amounts sufficient to increase the water saturation of said gas sands from connate saturation only to saturation at which initial water flow occurs while simultaneously producing gas from said gas sands through a gas production well penetrating the reservoir down-dip of the water injection well and up-dip of the gas-oil contact and producing oil from said oil sands through an oil production well penetrating said reservoir down-dip of the gas-oil contact.

3. A method of producing gas and oil from the gas and oil sands of a petroleum fluid-containing subterranean reservoir comprising the steps of: injecting water into the area of the top of said gas sands through an injection well penetrating said reservoir in an amount at least sufficient to increase the water saturation of the gas sands from connate saturation to saturation at which initial water flow occurs but less than that which would cause the water to reach the oil sands prior to depletion of the oil sands, said amount of water being calculable and dependent upon the distance between the top of the structure and the gas-oil contact, the angle of dip, and the permeability of the sands, while simultaneouly producing the gas from said gas sands through a gas production well penetrating said reservoir down-dip of the water injection well and up-dip of the gas-oil contact and producing oil from said oil sands through an oil production well penetrating said reservoir down-dip of the gas-oil contact.

References Cited in the file of this patent

UNITED STATES PATENTS

| | | |
|---|---|---|
| 2,842,204 | Horner | July 8, 1958 |
| 2,885,003 | Lindauer | May 5, 1959 |
| 2,896,719 | Hill | July 28, 1959 |